United States Patent
Yu

(10) Patent No.: US 9,410,438 B2
(45) Date of Patent: Aug. 9, 2016

(54) DUAL ROTOR BLADES HAVING A METAL LEADING AIRFOIL AND A TRAILING AIRFOIL OF A COMPOSITE MATERIAL FOR GAS TURBINE ENGINES

(71) Applicant: PRATT & WHITNEY CANADA CORP., Longueuil (CA)

(72) Inventor: Hong Yu, Oakville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 649 days.

(21) Appl. No.: 13/789,794

(22) Filed: Mar. 8, 2013

(65) Prior Publication Data

US 2014/0255197 A1    Sep. 11, 2014

(51) Int. Cl.
*F01D 5/28* (2006.01)
*F01D 5/14* (2006.01)

(52) U.S. Cl.
CPC ............... *F01D 5/282* (2013.01); *F01D 5/146* (2013.01); *F05D 2220/36* (2013.01); *Y02T 50/672* (2013.01); *Y02T 50/673* (2013.01); *Y10T 29/49332* (2015.01)

(58) Field of Classification Search
CPC ........... F01D 5/14–5/142; F01D 5/146; F01D 5/28–5/288; Y02T 50/672; Y02T 50/673
USPC ....... 416/198 A, 229 A, 23, 124, 125, 212 A, 416/230, 223 R, 223 A, 247 R; 415/208.1, 415/209.1; 29/889.6
See application file for complete search history.

(56) References Cited

U.S. PATENT DOCUMENTS

| | | | |
|---|---|---|---|
| 2,406,460 A * | 8/1946 | Guerke | B64D 35/04 416/129 |
| 3,850,545 A | 11/1974 | Weir | |
| 3,860,362 A | 1/1975 | Bentley et al. | |
| 3,867,062 A * | 2/1975 | Troller | F01D 5/146 415/194 |
| 3,901,625 A | 8/1975 | Witzel | |
| 3,914,069 A | 10/1975 | Arrington et al. | |
| 3,915,591 A | 10/1975 | Aiki et al. | |
| 4,037,987 A | 7/1977 | Charles et al. | |
| 4,172,693 A | 10/1979 | Barton et al. | |
| 4,981,414 A * | 1/1991 | Sheets | F01D 5/145 415/149.1 |
| 5,449,273 A * | 9/1995 | Hertel | F01D 5/147 205/271 |
| 5,486,096 A * | 1/1996 | Hertel | B64C 27/46 156/313 |
| 6,099,245 A * | 8/2000 | Bunker | F01D 5/146 415/115 |
| 6,200,092 B1 * | 3/2001 | Koschier | F01D 5/146 415/191 |
| 6,471,485 B1 * | 10/2002 | Rossmann | F01D 5/147 416/223 A |
| 6,607,358 B2 | 8/2003 | Finn et al. | |
| 7,736,131 B1 * | 6/2010 | Wilson, Jr. | B82Y 30/00 416/226 |
| 7,997,870 B2 | 8/2011 | Neumann | |
| 2005/0109011 A1 * | 5/2005 | Courtot | F01D 5/146 60/39.093 |
| 2006/0018753 A1 * | 1/2006 | Menian | F01D 5/146 416/175 |
| 2006/0093464 A1 * | 5/2006 | Moniz | F01D 25/16 415/68 |
| 2008/0075602 A1 | 3/2008 | Hill et al. | |
| 2011/0255987 A1 | 10/2011 | Ou | |

* cited by examiner

Primary Examiner — Thomas Denion
Assistant Examiner — Laert Dounis
(74) Attorney, Agent, or Firm — Norton Rose Fulbright Canada

(57) ABSTRACT

A rotor dual-blade for a gas turbine engine that has a first blade component extending radially between a root and a tip and a second blade component, separate from the first component, extending radially between a root and a tip, wherein the second blade component is downstream, in series, of the first blade component and at least the first blade component is made of metal while the second blade component is a light weight composite material.

10 Claims, 3 Drawing Sheets

DUAL ROTOR BLADES HAVING A METAL LEADING AIRFOIL AND A TRAILING AIRFOIL OF A COMPOSITE MATERIAL FOR GAS TURBINE ENGINES

TECHNICAL FIELD

The described subject matter relates generally to gas turbine engines, and more particularly to rotor blades.

BACKGROUND OF THE ART

Conventional gas-turbine engine blades are made of metal, such as titanium. Fan blades, of this type, are capable of withstanding the temperatures to which they are exposed, erosion resistance and have a relatively good chance of surviving impact with foreign bodies, such as bird strikes, without seriously affecting engine performance. Metal blades, however, are relatively heavy and so increase the overall weight of the engine and reduce its performance. Efforts have been made, therefore, in recent years to develop blades made of alternative, lighter materials such as composite materials, for example, carbon fiber epoxy composites. The problem with such composite blades is that they are not as robust as metal blades and are more easily damaged by contact with foreign objects. Attempts have been made to protect the leading edge of the blades, which are most likely to be subject to damage, by means of metal sheaths. Examples of composite blades are described in, U.S. Pat. Nos. 5,881,972 and 7,896,619.

Accordingly, there is a need to provide an improved blade for gas turbine engines.

SUMMARY

In one aspect there is provided a rotor blade for a gas turbine engine comprising a first airfoil component extending radially between a root and a tip and a second airfoil component, separate from the first airfoil component, extending radially between a root and a tip, wherein the second airfoil component is downstream, in series, of the first airfoil component and at least the first airfoil component is made of metal.

In a another aspect there is provided a fan for a turbo fan engine comprising an array circumferentially spaced transonic dual rotor blades with each dual rotor blade having a leading blade component and a separate trailing blade component arranged in series with the leading blade component; the leading blade component made of a metal to resist to foreign object damage and erosion, and the trailing blade component made of a relatively lighter material providing enhanced aerodynamic characteristics to the dual rotor blade such that the weight of the dual rotor blade is less than a similar rotor blade made of solid metal.

In a further aspect there is provided a method of forming a rotor blade for a gas turbine engine comprising the steps of forming an annular base, mounting an array of dual rotor blade assemblies in a circumferential spaced apart arrangement on said base which each rotor blade assembly extending radially between a root on the base and a tip, the improvement including the steps of arranging in each dual rotor blade assembly a leading blade component selected from a metal and a trailing blade component selected from a suitable composite material suitable to reduce the weight of the rotor assembly, in series relative to the leading blade component and adjusting the trailing rotor component to tune the dual rotor blade.

In a still further aspect there is provided a method of forming a rotor blade for a fan in a turbo fan turbine engine comprising the steps of forming an annular hub, mounting an array of rotor blade assemblies in a circumferentially spaced apart arrangement on said hub which each rotor blade assembly extending radially between a root on the hub and a tip; the improvement including the steps of arranging in each rotor blade assembly a leading blade component selected from a metal suitable to withstand foreign object damage at transonic tip speeds and a trailing blade component selected from a suitable composite material suitable to reduce the weight of the rotor assembly, in series relative to the leading blade component and adjusting the trailing rotor component to tune the rotor blade.

DESCRIPTION OF THE DRAWINGS

Reference is now made to the accompanying figures in which.

DETAILED DESCRIPTION

Figure 1:
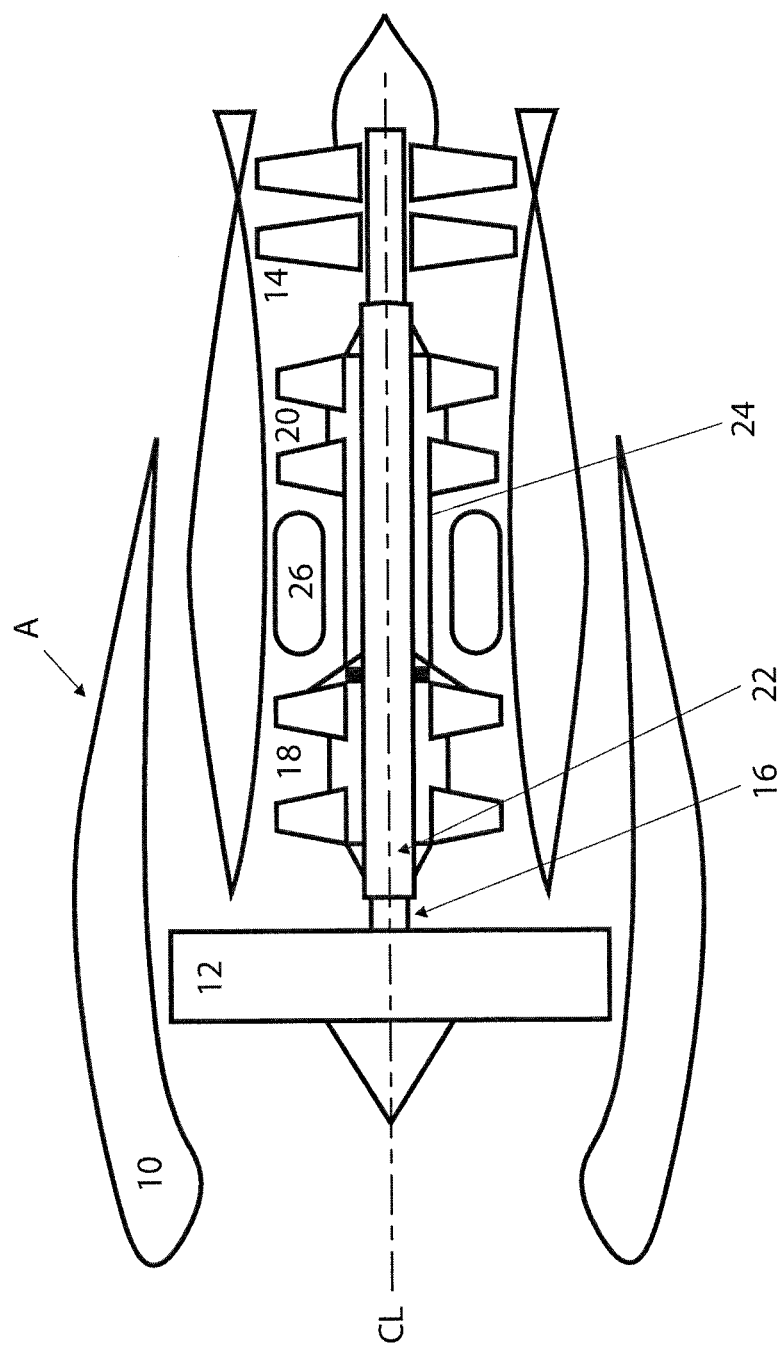
FIG. 1 is a schematic cross-sectional view of a fan type gas turbine engine.
Figure 2:
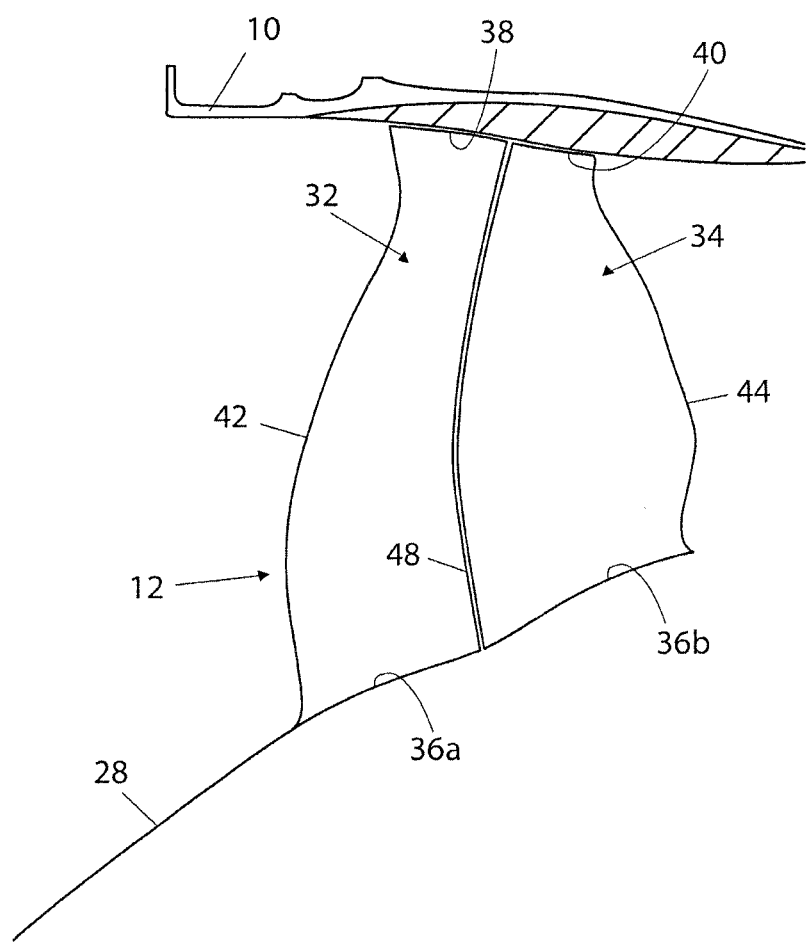
FIG. 2 is an axial cross-section of a portion of the engine with a side view of a detail of a preferred embodiment.

FIG. 1 schematically depicts a turbofan engine A which, as an example, illustrates the application of the described subject matter. The turbofan engine A includes a nacelle 10, a low pressure spool assembly which includes at least a fan 12 and a low pressure turbine 14 connected by a low pressure shaft 16, and a high pressure spool which includes a high pressure compressor 18 and a high pressure turbine 20 connected by a tie-shaft 22 and a high pressure shaft 24. The engine further comprises a combustor 26.

Advanced fans in turbofan engines are transonic with high rotor tip speeds. These transonic fans have to be strong enough to take a certain size of foreign object damage without a significant performance loss. At the same time, the reduction of weight is a key requirement for aircraft engine design.

The fan 12 described in the following example combines the features of transonic rotor tip speed with relatively lower weight compared to fans with existing all-titanium fan blades. The fan 12 includes an array of circumferentially spaced dual rotor blades, each made up of leading rotor blade 32 and trailing rotor blade 34. The leading rotor blade 32 is made of a strong metal such as titanium or stainless steel. Other equivalent or superior materials may also be contemplated, as long as the criteria of resistance to foreign object damage and resistance to erosion are maintained. The term "metal" is defined herein to include such equivalent or superior materials.

The trailing rotor blade 34 is constructed of a lighter composite material. In one embodiment the composite material comprises carbon nanotubes. In another embodiment, carbon fibers are placed in multiple layers and are embedded with a polymer resin such as an epoxy-based resin. The trailing rotor blade 34 has the function of enhancing the aerodynamic characteristics of the dual fan blade while reducing the weight coefficient of the combined leading rotor blade 32 and the trailing rotor blade 34 (dual fan blade).

Each rotor blade 32, 34 includes a root 36a, 36b respectively. The roots 36a, 36b may be combined or separate. The leading rotor blade 32 has a tip 38 while the trailing rotor blade 34 has a tip 40. The dual rotor blade 32, 34 includes a leading edge 42 and a trailing edge 44.

A lengthwise gap 48 is defined between the leading rotor blade 32 and the trailing rotor blade 34. The gap is quite small (exaggerated in the drawings) and will generally be in the range of 1% to 5% of the blade pitch. The gap may be filled with an elastomer such as rubber.

The fan 12, in the present embodiment, has a weight advantage over a conventional metal fan, while at the same time having the Foreign Object Damage resistance of a metal fan because the leading rotor blade 32 covers the impacted region of Foreign Object Damage. From an aerodynamic standpoint, the dual rotor blades 32 and 34, have the further advantage of producing lower pressure losses than a single rotor blade with the aerodynamic loading or turning. Further advantages of the fan 12 include that wakes produced thereby may be weaker than those of the equivalent single rotor design, and as such will reduce the fan noise. The fan noise may be further reduced by optimising the loading balance between the leading rotor blade 32 and the trailing rotor blade 34.

Fan flutter is a challenging design issue for transonic fans. The dual fan concept that is described herein provides a further degree of freedom to tune the leading, upstream rotor blade 32 and the trailing, downstream rotor blade 34.

Figure 3:
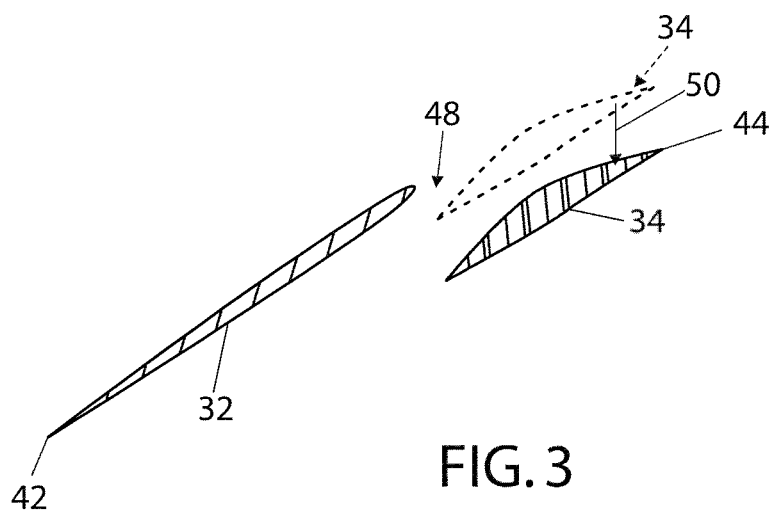
FIG. 3 is a schematic cross section of the detail shown in FIG. 2, at right angles thereto, showing a particular feature thereof.
Figure 4:
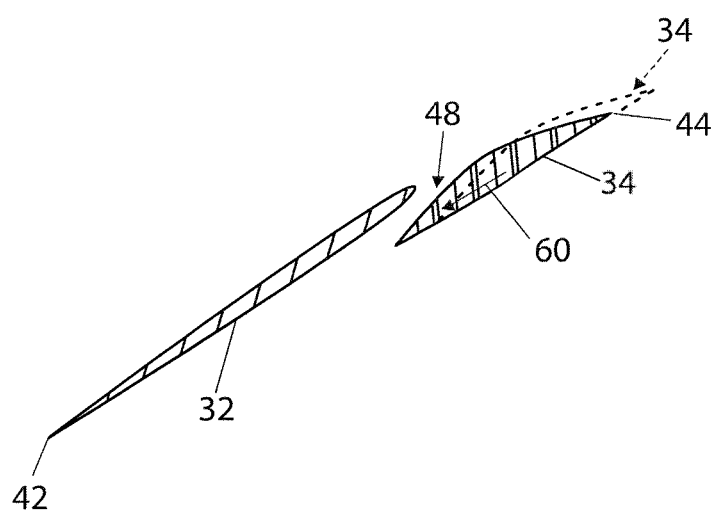
FIG. 4 is a schematic cross section of the detail shown in FIG. 2, at right angles thereto, showing a different feature compared to FIG. 3.

FIG. 3 and FIG. 4 illustrate alternate designs with the type of tuning that may be possible. FIG. 3 illustrates the clocking of the trailing rotor blade 34 where arrow 50 illustrates the possible circumferential movement of the trailing rotor blade 34 relative to the leading rotor blade 32, to change the relative angular position of the trailing rotor blade 34 with regard to the leading rotor blade 32.

Similarly in FIG. 4, arrow 60 illustrates the axial movement that the trailing rotor blade 34 can achieve such that the trailing rotor blade 34 can overlap with the leading rotor blade 32 thus reducing the chord length of the dual blade while changing the angle thereof.

Thus the trailing rotor blade 34 may act as an aileron relative to the leading rotor blade 32 and may be tuned for ultimate aerodynamic performance.

The dual blade concept is shown as a fan, described herein above. However it is contemplated that the same concept may be applied to compressor or turbine rotors.

The above description is meant to be exemplary only, and one skilled in the art will recognize that changes may be made to the embodiments described without departing from the scope of the described subject matter. Still other modifications which fall within the scope of the described subject matter will be apparent to those skilled in the art, in light of a review of this disclosure, and such modifications are intended to fall within the appended claims.

The invention claimed is:

1. A rotor blade for a rotor of a gas turbine engine comprising a first airfoil component extending radially between a root and a tip and a second airfoil component, separate from the first airfoil component, extending radially between a root and a tip, the second airfoil component positioned downstream, in series, of the first airfoil component, the first airfoil component being metal and the second airfoil component being of a composite material, the first airfoil component forming the leading rotor blade component while the second airfoil component forms the trailing rotor blade component whereby the first airfoil component is suitable for transonic tip speeds while resisting foreign damage and erosion, and the composite material of the second airfoil component is a relatively lighter material, wherein an axial gap is defined between the leading airfoil component and the trailing airfoil component, and wherein the axial gap is filled with an elastomer.

2. The rotor blade as defined in claim 1 wherein the metal of the first airfoil component is selected from a group of metals containing titanium and stainless steel while the composite material of the second airfoil component is made of a light composite material such that the weight of the two-component rotor blade is less than a similar rotor blade made of solid metal.

3. The rotor blade as defined in claim 1 wherein the composite material of the second airfoil component comprises carbon nanotubes such that the weight of the two-component rotor blade is less than a similar rotor blade made of solid metal.

4. The rotor blade as defined in claim 1 wherein the composite material of the second airfoil component comprises carbon fibers placed in multiple layers and embedded with a polymer resin so that the weight of the two-component rotor blade is less than a similar rotor blade made of solid metal.

5. The rotor blade as defined in claim 1 wherein the rotor blade is a fan blade in a turbofan turbine engine.

6. The rotor blade as defined in claim 1 wherein the rotor blade is a rotor blade in any of a compressor and turbine section in a gas turbine engine.

7. A fan rotor for a turbo fan engine comprising an array of circumferentially spaced transonic dual rotor blades with each dual rotor blade having a leading blade component and a separate trailing blade component arranged in series with the leading blade component; the leading blade component made of a metal to resist foreign object damage and erosion, and the trailing blade component made of a relatively lighter material providing a light weight to the dual rotor blade such that the weight of the dual rotor blade is less than a similar rotor blade made of solid metal, wherein an axial gap is defined between the respective leading blade component and the trailing blade component, the axial gap being between 1% and 5% of the blade pitch, and wherein each of the axial gaps is filled with an elastomer.

8. The fan rotor as defined in claim 7 wherein leading rotor blade component is made of a strong metal selected from a group containing titanium or stainless steel.

9. The fan rotor as defined in claim 8 wherein the trailing blade component is made of composite material including carbon nanotubes such that the weight of the dual rotor blade is less than a similar rotor blade made of solid metal.

10. The fan rotor as defined in claim 8 wherein the trailing blade component is made of a composite material comprising carbon fibers placed in multiple layers and embedded with a polymer resin such as an epoxy-based resin so that the weight of the dual rotor blade is less than a similar rotor blade made of solid metal.

* * * * *